United States Patent
Lurie et al.

(10) Patent No.: US 8,155,107 B2
(45) Date of Patent: *Apr. 10, 2012

(54) CURRENT POSITION TRANSMISSION IN A SHARED ROBUST SCHEME

(75) Inventors: Aharona Lurie, Or Yehuda (IL); Ronald Bruce Sterenson, Ra'anana (IL)

(73) Assignee: Sigma Designs Israel S.D.I Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/705,665

(22) Filed: Feb. 15, 2010

(65) Prior Publication Data

US 2010/0189126 A1   Jul. 29, 2010

Related U.S. Application Data (63) Continuation-in-part of application No. 12/261,170, filed on Oct. 30, 2008.

(60) Provisional application No. 60/983,615, filed on Oct. 30, 2007, provisional application No. 60/989,658, filed on Nov. 21, 2007, provisional application No. 61/152,702, filed on Feb. 15, 2009.

(51) Int. Cl.
  *H04J 3/06* (2006.01)

(52) U.S. Cl. .......... 370/350; 370/338; 370/458
(58) Field of Classification Search .......... 370/338, 370/350

See application file for complete search history.

(56) References Cited

U.S. PATENT DOCUMENTS

| | | | | |
|---|---|---|---|---|
| 5,359,320 | A * | 10/1994 | Jaffe et al. | 370/448 |
| 7,133,423 | B1 | 11/2006 | Chow et al. | |
| 7,603,146 | B2 * | 10/2009 | Benveniste | 455/574 |
| 2004/0141517 | A1 * | 7/2004 | Balasubramanian et al. | 370/462 |
| 2006/0114927 | A1 | 6/2006 | Baum | |
| 2007/0064720 | A1 | 3/2007 | Sterenson | |
| 2008/0195312 | A1 * | 8/2008 | Aaron et al. | 701/209 |

* cited by examiner

*Primary Examiner* — Phuc Tran
(74) *Attorney, Agent, or Firm* — AlphaPatent Associates Ltd.; Daniel J. Swirsky (57) ABSTRACT

A method implemented on a network node includes receiving an adjustable schedule of transmission start slots, where the transmission start slots represent transmission initiation opportunities for the initiation of data transmission by at least one of a plurality of network devices on a network, and transmitting a current position of the node within all groups of the schedule suitable for full resynchronization to the adjustable schedule by at least one other the network node.

30 Claims, 6 Drawing Sheets

CURRENT POSITION TRANSMISSION IN A SHARED ROBUST SCHEME

CROSS-REFERENCE TO RELATED APPLICATIONS

This application is a continuation-in-part application of U.S. patent application Ser. No. 12/261,170, filed Oct. 30, 2008, which claims benefit from U.S. Provisional Patent Application Nos. 60/983,615, filed Oct. 30, 2007, and 60/989,658, filed Nov. 21, 2007, which are hereby incorporated in their entirety by reference. This application also claims benefit from U.S. Provisional Patent Application No. 61/152,702, filed Feb. 15, 2009, which is hereby incorporated in its entirety by reference.

FIELD OF THE INVENTION

The present invention relates to data networks generally and to media access allocation in data networks in particular.

BACKGROUND OF THE INVENTION

There are many different types of data networks, of which Ethernet is perhaps the best known. Some data networks have resource reservation schemes. One such network is Home-PNA (Home Phoneline Network Alliance) v3.1 which is designed to work over existing telephone lines to create a home/small office network. U.S. patent application Ser. No. 11/000,524, filed Dec. 1, 2004 and assigned to the common assignee of the present invention, describes generally how to extend the HomePNA v3.1 standard to operate over a hybrid network of telephone and coax lines.

HPNA v3.1 and other such resource reservation networks have a scheduler, described hereinbelow, to guarantee media resources to network devices, to prevent collision between multiple network devices using the same line and to ensure quality of service. In coax networks, preventive collision detection limits the dynamic range of the network devices, which may impose physical limitations on the size of the network, so it is preferable to use collision avoidance methods for media access in coax networks.

Such a collision avoidance method is disclosed in U.S. patent application Ser. No. 11/218,708 entitled 'Collision Avoidance Media Access Method for Shared Networks', filed Sep. 6, 2005 and assigned to the common assignee of the present invention. This application is incorporated herein by reference. The collision avoidance/carrier sensing media access (CA/CSMA) method disclosed in the application employs a media access plan (MAP) having sub-burst slots. Each sub-burst slot has a shorter duration than a minimal transmission burst duration (e.g., 8-32 μsecs), is associated with a particular one or group of network participants, and represents an opportunity for the initiation of a data transmission by its associated network participants.

Figure 1A:
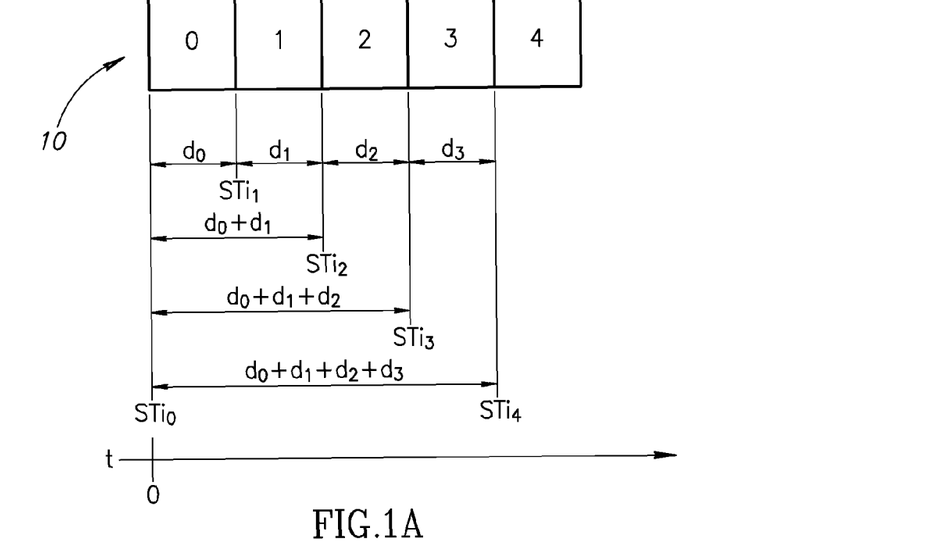
FIG. 1A is an illustration of a schedule of sub-burst slots according to an exemplary media access plan (MAP) operative in a network employing a collision avoidance/carrier sensing media access (CA/CSMA) method.

The MAP for a transmission cycle dictates a schedule of sub-burst slots, wherein numbered sub-burst slots are scheduled in a particular order. FIG. 1A, reference to which is now made, shows an exemplary sub-burst slot schedule 10, in which five sub-burst slots numbered 0 through 4 are scheduled in sequential order. Sub-burst slot schedule 10 may also be seen as a grid of transmission opportunity start times. The start time $ST_N$ for each sub-burst slot N is the moment at which the network participant associated with sub-burst slot N may begin to transmit.

In the initial grid of transmission opportunity start times (before any transmissions occur), the start time of each sub-burst slot N, $ST_N$, occurs after the sum of the durations of the sub-burst slots preceding sub-burst slot N. For example, as shown in FIG. 1A, the initial start times $STi_0$, $STi_1$, $STi_2$, $STi_3$, and $STi_4$ of sub-burst slots 0-4 respectively, occur at (t=0), ($t=d_0$), ($t=d_0+d_1$), ($t=d_0+d_1+d_2$), and ($t=d_0+d_1+d_2+d_3$) respectively, where $d_0$, $d_1$, $d_2$, and $d_3$ are the durations of sub-burst slots 0-4 respectively.

The principal advantage of sub-burst slots over regular sized time slots is that when a network participant does not use its transmission opportunity, minimal time is wasted before the opportunity to transmit is passed to the next network participant in the queue. On the other hand, when a network participant opts to transmit when its turn arrives, the allowable transmission duration is not limited by the short duration of the sub-burst slot. Rather, the sub-burst slot expands to encompass the required transmission burst duration. Accordingly, the start times of the succeeding sub-burst slots are delayed by an amount of time equal to the portion of the transmission duration which exceeds the original sub-burst slot duration. In effect, the entire grid of transmission opportunity start times shifts by this amount.

Figure 1B:
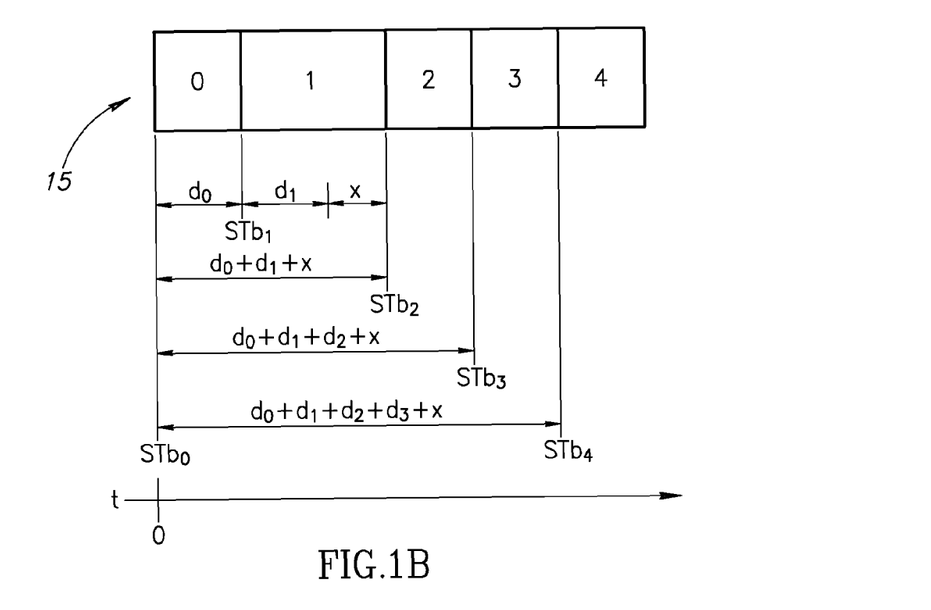
FIG. 1B is a timing diagram illustration for an exemplary transmission cycle for the schedule of FIG. 1.

For example, as shown in FIG. 1B, reference to which is now made, timing diagram 15 for an exemplary transmission cycle operating in accordance with sub-burst slot schedule 10 shows how a transmission during sub-burst slot '1' alters the initial grid of transmission opportunity start times for the sub-burst slots following sub-burst slot '1'. As shown in FIG. 1B, start times $STb_2$, $STb_3$ and $STb_4$ are incremented by x, the portion of the transmission transmitted during sub-burst slot '1' which exceeds the original sub-burst slot duration $d_1$.

In a network employing the CA/CSMA method described hereinabove, all of the participating network nodes receive the MAP and extract from it their relative transmission opportunities. Then they employ physical carrier sensing (PCS) to monitor transmissions occurring over the network so that, subsequent to each transmission, they can synchronize to an updated transmission opportunities (TXOPs) schedule accounting for transmission-induced shifts in the sub-burst slot start time grid.

Successful implementation of PCS is important for optimal operation of collision avoidance as described hereinabove. The carrier sensors in all of the network nodes must receive the same information regarding transmissions occurring over the network in order to guarantee synchronization of all nodes to the same timing and transmission opportunities schedule.

SUMMARY OF THE PRESENT INVENTION

There is provided, in accordance with a preferred embodiment of the present invention, a method implemented on a network node including receiving an adjustable schedule of transmission start slots, where the transmission start slots represent transmission initiation opportunities for the initiation of data transmission by at least one of a plurality of network devices on a network, and transmitting a current position of the node within all groups of the schedule suitable for full resynchronization to the adjustable schedule by at least one other the network node.

Further, in accordance with a preferred embodiment of the present invention, the transmission start slots in the adjustable schedule are scheduled in transmission groups, each transmission group associated with a group of the network devices, and the current position contains at least an indication of a current the transmission group and a current the transmission start slot within the current transmission group.

Still further, in accordance with a preferred embodiment of the present invention, the transmitting also includes transmitting the current position together with a data payload.

Additionally, in accordance with a preferred embodiment of the present invention, the transmitting also includes transmitting the current position together with a null transmission.

Moreover, in accordance with a preferred embodiment of the present invention, the current position also contains indications of each other transmission group and current transmission start slots with the transmission groups.

Further, in accordance with a preferred embodiment of the present invention, the transmitting is in response to the network node losing synchronization with the adjustable schedule.

Still further, in accordance with a preferred embodiment of the present invention, the transmitting is scheduled without relation to a loss of synchronization with the adjustable schedule by the network node.

Additionally, in accordance with a preferred embodiment of the present invention, the transmitting also includes transmitting the current position within at least one of an acknowledgement (ACK) or request to send (RTS).

There is also provided, in accordance with a preferred embodiment of the present invention, a method implemented on a network node including receiving an adjustable schedule of transmission start slots, where the transmission start slots represent transmission initiation opportunities for the initiation of data transmission by at least one of a plurality of network devices in a network, listening for transmissions by other the network nodes according to the received schedule, the transmissions at least indicating a current position within all transmission groups of the adjustable schedule, and adjusting the received schedule in accordance with the indicating.

Further, in accordance with a preferred embodiment of the present invention, the transmission start slots in the adjustable schedule are scheduled in the transmission groups, each transmission group associated with a group of the network devices, and the current position contains at least an indication of a current the transmission group and a current the transmission start slot within the current transmission group.

Still further, in accordance with a preferred embodiment of the present invention, the transmissions include the current position and a data payload.

Additionally, in accordance with a preferred embodiment of the present invention, the transmissions comprise the current position and a null transmission.

Moreover, in accordance with a preferred embodiment of the present invention, the adjusting also includes synchronizing the current transmission group in the adjustable schedule in accordance with the current transmission group in the current position, and synchronizing the current transmission slot in the adjustable schedule in accordance with the current transmission slot in the current position.

Further, in accordance with a preferred embodiment of the present invention, the current position also contains indications of each other the transmission groups and current transmission start slots within the transmission groups.

Still further, in accordance with a preferred embodiment of the present invention, the adjusting also includes synchronizing each the transmission group in the adjustable schedule in accordance with each the transmission group in the current position, and synchronizing each current transmission slot in each transmission group in the adjustable schedule in accordance with the current position Additionally, in accordance with a preferred embodiment of the present invention, the transmitting also includes transmitting the current position and at least one of an ACK or RTS.

There is also provided, in accordance with a preferred embodiment of the present invention, a network node including a receiver to receive an adjustable schedule of transmission start slots, where the transmission start slots represent transmission initiation opportunities for the initiation of data transmission by at least one of a plurality of network devices on a network, and a transmitter to transmit a current position representing all current transmission groups for resynchronization to the adjustable schedule by at least one other the network node.

Further, in accordance with a preferred embodiment of the present invention, the transmission start slots in the adjustable schedule are scheduled in the transmission groups, each transmission group associated with a group of the network devices, and the current position contains at least an indication of a current the transmission group and a current the transmission start slot within the current transmission group.

Still further, in accordance with a preferred embodiment of the present invention, the transmitter also includes means to transmit the current position with a data payload.

Additionally, in accordance with a preferred embodiment of the present invention, the transmitter also includes means to transmit the current position with a null transmission.

Moreover, in accordance with a preferred embodiment of the present invention, the current position also contains indications of each other the transmission groups and current transmission start slots with the transmission groups.

Further, in accordance with a preferred embodiment of the present invention, the transmitter also includes means for transmitting the current position and at least one of an ACK or RTS.

There is also provided, in accordance with a preferred embodiment of the present invention, a network node including a receiver to receive an adjustable schedule of transmission start slots, where the transmission start slots represent transmission initiation opportunities for the initiation of data transmission by at least one of a plurality of network devices in a network, a listening to listen for transmissions by other the network nodes according to the received schedule, the transmissions at least indicating a current position for all transmission groups within the adjustable schedule, and an adjuster to adjust the received schedule in accordance with the current position.

Further, in accordance with a preferred embodiment of the present invention, the transmission start slots in the adjustable schedule are scheduled in the transmission groups, each transmission group associated with a group of the network devices, and the current position contains at least an indication of a current the transmission group and a current the transmission start slot within the current transmission group.

Still further, in accordance with a preferred embodiment of the present invention, the transmissions include the current position and a data payload.

Additionally, in accordance with a preferred embodiment of the present invention, the transmissions include the current position and a null transmission.

Moreover, in accordance with a preferred embodiment of the present invention, the adjuster also includes means for synchronizing the current transmission group in the adjustable schedule in accordance with the current transmission group in the current position, and means for synchronizing the current transmission slot in the adjustable schedule in accordance with the current transmission slot in the current position.

Further, in accordance with a preferred embodiment of the present invention, the current position also contains indications of each other the transmission groups and current transmission start slots within the transmission groups.

Still further, in accordance with a preferred embodiment of the present invention, the adjusting also includes means for synchronizing each the transmission group in the adjustable schedule in accordance with each the transmission group in the current position, and means for synchronizing each the current transmission slot in the each transmission group in the adjustable schedule in accordance with the current position.

Additionally, in accordance with a preferred embodiment of the present invention, the transmitter also includes means for transmitting the current position and at least one of an ACK or RTS.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

While the HPNA network described in the Background is designed to run on telephone lines, other implementations are also possible. For example, HPNA 3.1 may also be implemented on home power lines. It will be appreciated that power lines are not ideal data carriers. They are designed to provide electrical current as needed, and accordingly, they are subject to frequent surges and other possible causes of interference. As media for data transmission they are inherently noisier than telephone lines and/or dedicated data lines.

In such a noisy environment, network synchronization may be lost if one or more of the network nodes miss a transmission over the network due to the intermittent noise that may be typical on power lines. In another scenario, loss of synchronization may occur when noise on the line is incorrectly interpreted by a node as a valid data transmission. An unsynchronized node may then mistakenly identify a transmission opportunity associated with a different node as its own opportunity to transmit, and collisions may occur, increasing the packet error rate (PER). This undesirable situation could continue for a relatively long period of time until a new media access plan (MAP) is publicized and the network nodes are resynchronized.

In the presence of such interference, PCS be problematic when used for powerline media and other methods may be required to maintain synchronization. In accordance with a preferred embodiment of the present invention, timed-reception may be implemented as an alternative to PCS, and the CSMA sub-burst slots media access method may be modified accordingly to achieve a "virtual carrier sensing" (VCS) mode.

Figure 2A:
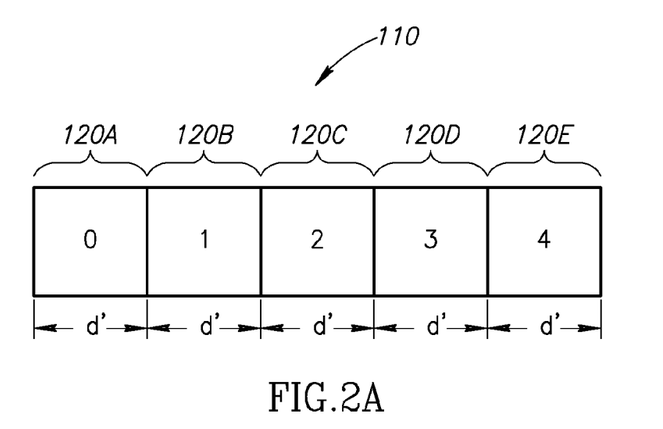
FIG. 2A is an illustration of a novel transmission start slot TDMA (time division multiple access) contention TXOP schedule, designed and operative in accordance with a preferred embodiment of the present invention.
Figure 2B:
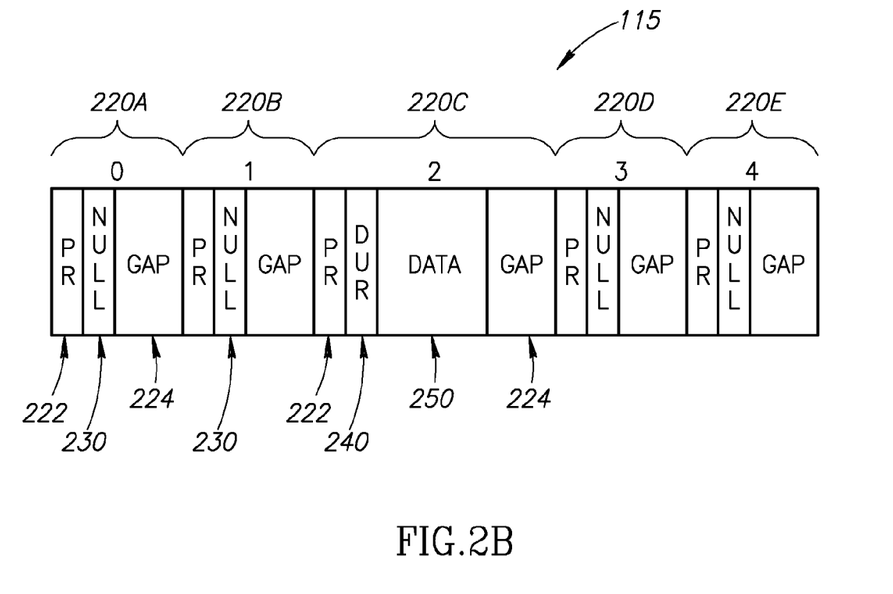
FIGS. 2B-E are illustrations of timing diagram for exemplary transmission cycles operating in accordance with the schedule of FIG. 2A.

Reference is now made to FIGS. 2A and 2B. FIG. 2A illustrates a novel transmission start slot TDMA (time division multiple access) contention TXOP schedule 110, designed and operative in accordance with a preferred embodiment of the present invention. FIG. 2B illustrates timing diagram 115 for an exemplary transmission cycle operating in accordance with transmission start slot schedule 110.

As shown in FIG. 2A, schedule 110 may comprise a multiplicity of transmission start slots 120, herein labeled from 0 to 4. Each transmission start slot 120 has a scheduled minimum duration of d'. It will be appreciated that as will be described hereinbelow, d' may be slightly longer in duration than duration d in FIG. 1A. Unlike the prior art, transmission start slots may have a longer duration than a minimal transmission burst duration In accordance with a preferred embodiment of the present invention, nodes with nothing to transmit may not remain silent as in the prior art. Instead, each such node may transmit a short frame with a null indication when it has no data to transmit. FIG. 2B illustrates a timing diagram 115 for an exemplary transmission cycle based on transmission start slot schedule 110.

Transmission start slots 120 from FIG. 2A may be replaced by transmission frames 220 in FIG. 2B. Each transmission frame 220 may comprise a preamble 222 and a gap 224. A preamble 222 may represent an analog signal transmitted by a node at the beginning of a transmission frame 220. Gaps 224 may represent a period of non transmission "silence" at the end of a transmission frame. Gaps 224 may serve to demark the end of a frame 224 and make it easier for nodes to detect a subsequent preamble 222.

Transmission frame 220C (corresponding to transmission start slot 120C) represents a transmission of a node with a data payload to transmit. When a node has data to transmit, a duration 240 may be added as a part of a frame control (FC) with preamble 222. The FC may then be followed by data payload 250 and gap 224. Duration 240 may specify a new d' for the associated transmission start slot 120. For example, in FIG. 2A, transmission start slot 120C may have a scheduled duration of d'. However, duration 240 may indicate that the expected duration for transmission frame 220C may now be d' plus the expected duration of a transmission of data payload 250. A grid scheduler on the receiving node may use this information to update the grid of transmission opportunity start times originally represented by schedule 110.

Null symbols 230 may be used to indicate that a node has no data payload to transmit. Null symbols 230 may be included as a type field in, or in place of an FC. As shown for exemplary transmission frames 220A, 220B, 220D and 220E corresponding to transmission start slots 120A, 120B, 120D and 120E from FIG. 2A, such nodes may indicate the transmission of "null frames" by transmitting a null 230 between preamble 222 and gap 224. It will be appreciated that other nodes may interpret a null frame as an indication that the transmitting node may have no data payload to transmit. In such a case it may be expected that a current transmission frame 220 may be of a standard length of d' and no other signal processing may be necessary until d' duration may have passed. In accordance with an alternative preferred embodiment of the present invention, a null frame may also comprise a duration 240.

Nodes on the network may therefore effectively "ignore" any ensuing transmissions until d' duration may have passed. Any transmissions received may be assumed to be random interference on the line, and accordingly may be ignored without requiring any interpretation or processing. In accordance with an alternative preferred embodiment of the present invention, during this time the nodes may enter an energy conservation mode by turning off their receivers.

It will be appreciated that the present invention may enable a receiving node to calculate when a next transmission frame 220 may be expected without having to rely on PCS. VCS may be used instead to determine exactly when a next frame may be expected.

It will be appreciated that transmission frames 220 as shown in FIG. 2B may represent a simplified representation of the components of a typical transmission frame 220. For example, in accordance with a preferred embodiment of the present invention, the FC for transmissions with data payloads such as transmission frame 220C may also comprise fields indicating the "current position" of the transmission within the grid of timeslot opportunities as represented in schedule 110. Such information on "current position" may be used by a node to resynchronize to the grid as necessary.

Figure 2C:
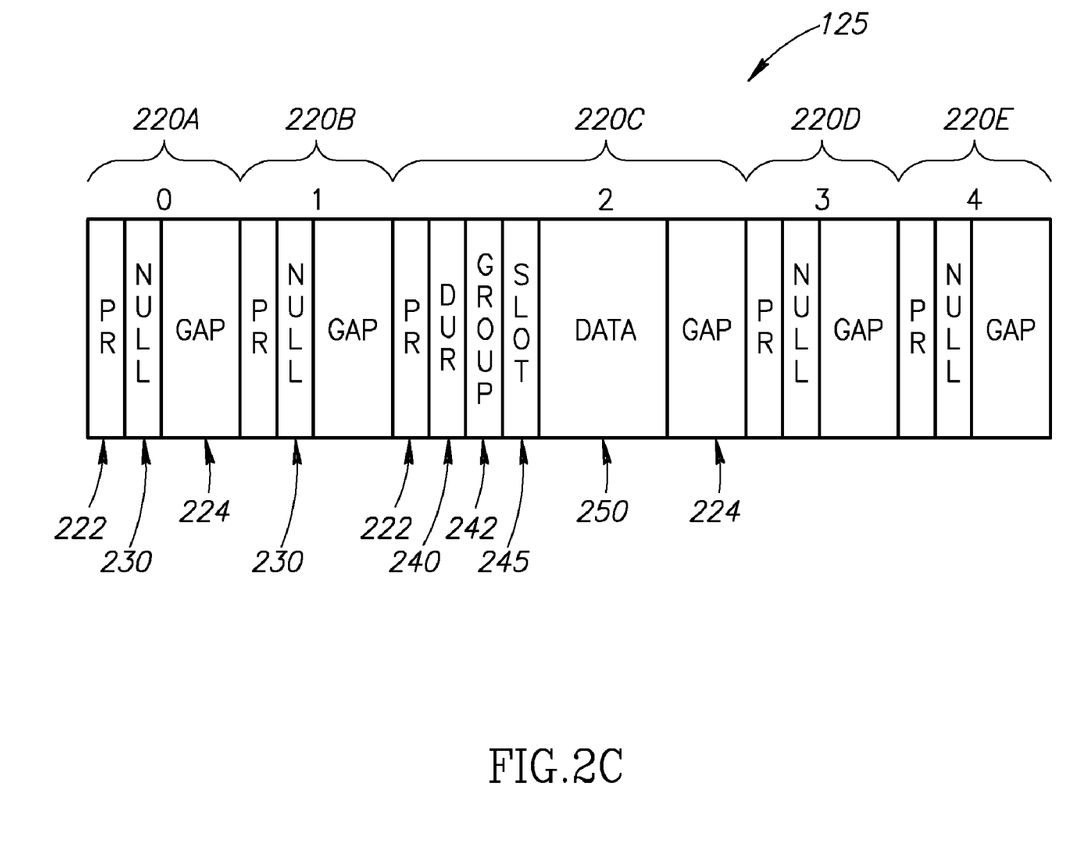

Reference is now made to FIG. 2C which illustrates exemplary timing diagram 125, a more detailed view of the exemplary timing diagram 115 of FIG. 2B. Null transmission frames 220A, B, D and E may generally be the same as in timing diagram 115. However, transmission frame 220C may comprise two additional elements: group 242 and slot 245. It will be appreciated that group 242 and slot 245 may together indicate a "current position" for the transmitting node.

For example, if line interference causes a node to lose synchronization, it may listen for a next transmission frame 220 with a data payload 250 such as frame 220C. When frame 220C may be received, a "lost" node may resynchronize to the grid using the information in the current position fields. "Current position" information may include, as shown in exemplary timing diagram 125, group and slot information as per the current schedule 110. Accordingly, the lost node may resynchronize within a given group when a data payload transmission (such as represented by frame 220C) is received from a node in that given group. It will be appreciated that the elements shown as part of the "current position" may be exemplary; the present invention may be implemented with other such additional fields in the FC as necessary.

It will be appreciated, however, that the amount of "current position" information in a transmission frame 220 may be limited. For example, the FC for transmission frame 220C may comprise group 242 and slot 245 values for the currently transmitted frame 220, but may not include information regarding other groups. Accordingly, while a non-synchronized node may use such current position information to resynchronize with the schedule for the group of nodes currently transmitting, it may not be able to synchronize with the schedule for the other groups that may follow as per schedule 110.

Figure 2D:
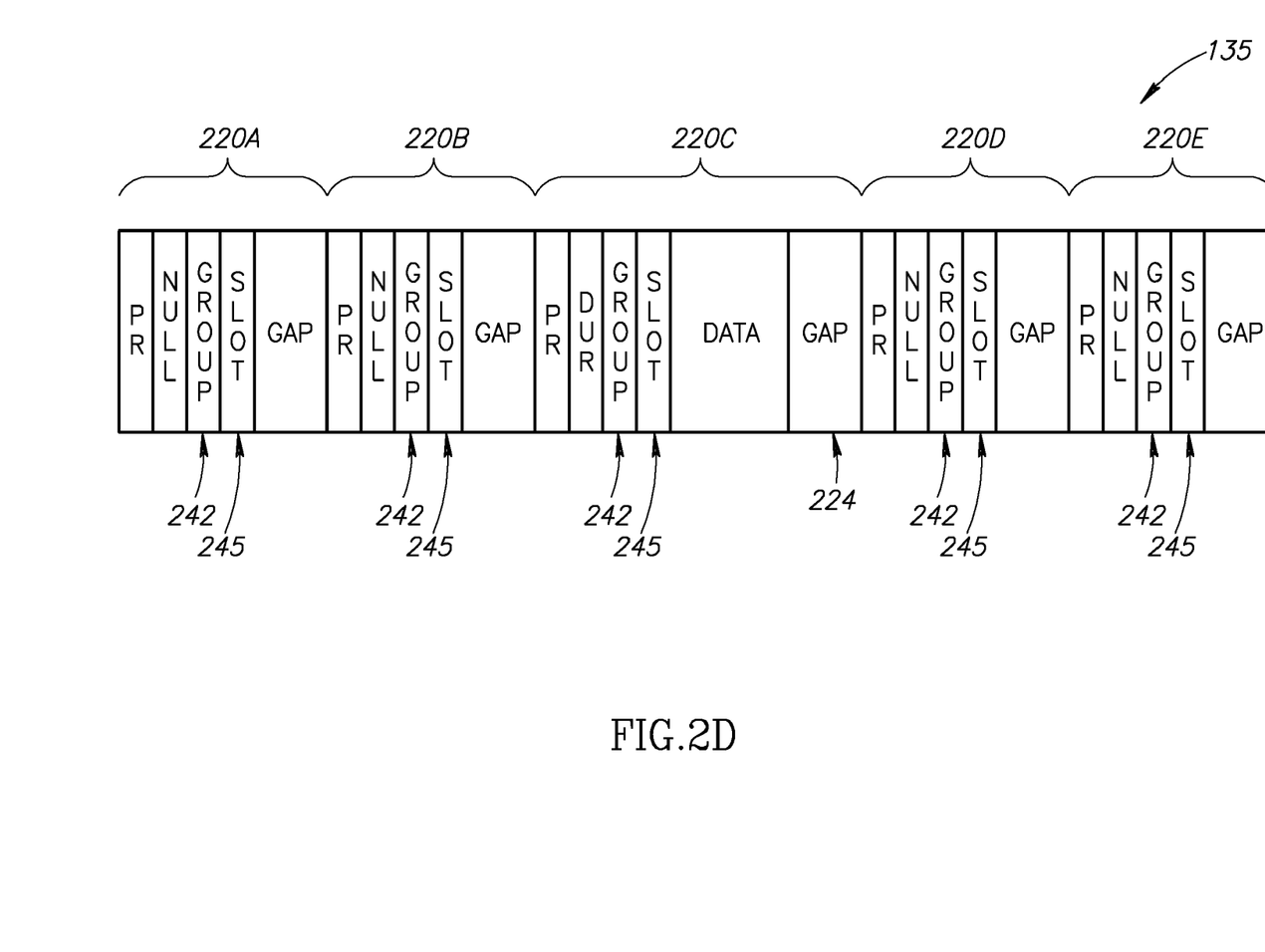

In accordance with a preferred embodiment of the present invention, null transmissions may be expanded to include group and slot information in an FC. Reference is now made to FIG. 2D, which illustrates an exemplary timing diagram 135, also per schedule 110, in accordance with another preferred embodiment of the present invention. As shown, any transmission frame 220 may also include current position information, regardless of whether it maybe a null transmission, such as represented by frames 220A, B, D and E, or a data payload transmission such as represented by 220C. Accordingly, a non synchronized node may synchronize to a current group and slot position by detecting any single transmission frame 220 from that group, regardless of whether or not the detected transmission may be full payload transmission. A non synchronized node may therefore resynchronize with a current group even if none of the nodes in the group may be currently transmitting data payloads. Accordingly, the present invention may enable resynchronization to all groups in a relatively short period of time, regardless of the level of data traffic on the network.

Figure 2E:
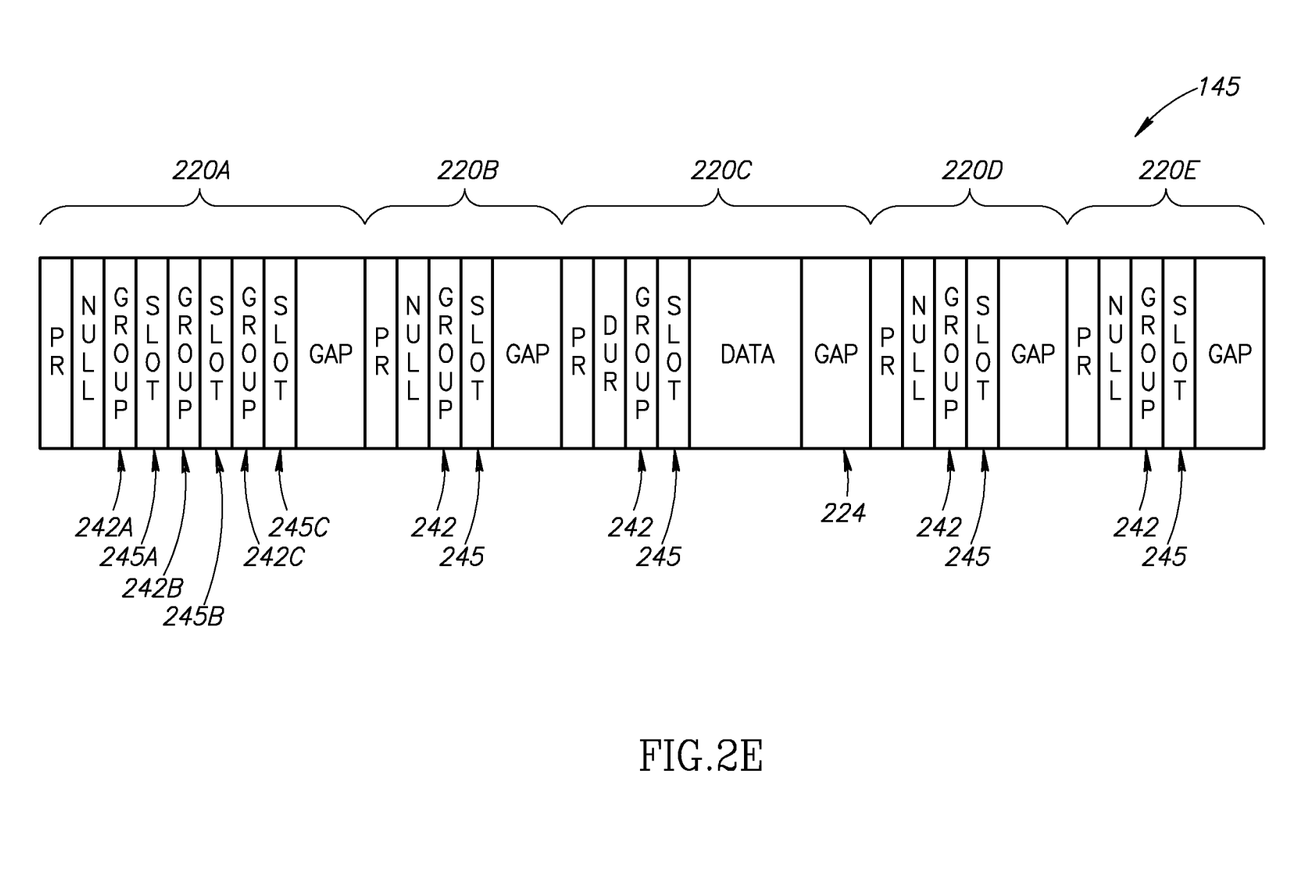

It will be appreciated that timing diagram 135 may be exemplary; the current invention may also be configured in such a manner that only some, but not all, null transmissions may include current position information. For example, in accordance with another exemplary preferred embodiment, only null transmissions in the first slot 120 in a given group may include current position information. Alternatively, a percentage of nodes transmitting null transmissions with current position information may be set to be a function of the reliability and quality of the available bandwidth Reference is now made to FIG. 2E which illustrates exemplary timing diagram 145. Timing diagram 145 may be generally similar to timing diagram 135. However, in accordance with another preferred embodiment of the present invention, transmission frame 220A which may represent a null transmission, may comprise expanded current position information which may represent the node's current view of the current position of all scheduled transmission groups. For example, the current MAP may include time slots 120 scheduled for three groups. The node transmitting frame 220A may provide its own current position information in group 242A and slot 245, thus enabling a non synchronized node to synchronize with the current group. Frame 220A may also comprise groups 242B and C as well as slots 245B and C which may represent the current position for the other two groups, thus enabling a non synchronized node to synchronize with the entire schedule based on a single received transmission.

It will be appreciated that the number of groups 242 represented in frame 220A may be exemplary; the present invention may include any number of scheduled groups. Furthermore, it will also be appreciated that the present invention may also include other configurations for the percentage and/or order of null transmissions with expanded current position information.

In accordance with an exemplary preferred embodiment of the present invention, other non null transmission frames 220 without data payloads may also include current position information. Such non null transmission frames 220 without data payloads may include, for example, acknowledgement (ACK) and request to send (RTS) frames. Such frames may also be sufficiently short in length to facilitate the addition of current position and/or expanded current position information as necessary. Accordingly it will be appreciated the embodiments of FIGS. 2D and 2E may include frame types such as ACK and RTS in addition to, or even instead of null transmission frames.

It will be appreciated that TDMA transmission start slots media access may be less efficient than the prior art. The overhead required to transmit a null 230 along with preamble 22 and gap 224 may increase the duration of a null transmission frame 220 vis-à-vis a silent frame as represented in FIG. 1B. Such increased duration may reduce the bandwidth available for the transmission of data.

Figure 3A:
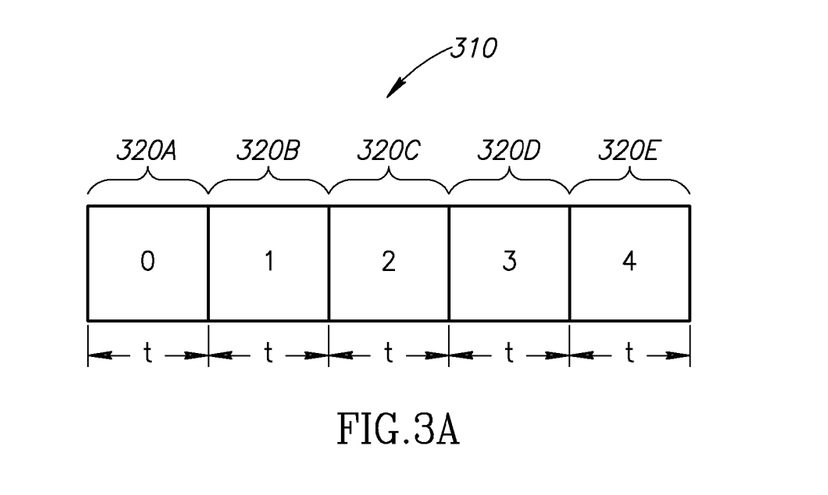
FIG. 3A is an illustration of a novel transmission start slot TDMA (time division multiple access) contention TXOP schedule, designed and operative in accordance with a preferred embodiment of the present invention.
Figure 3B:
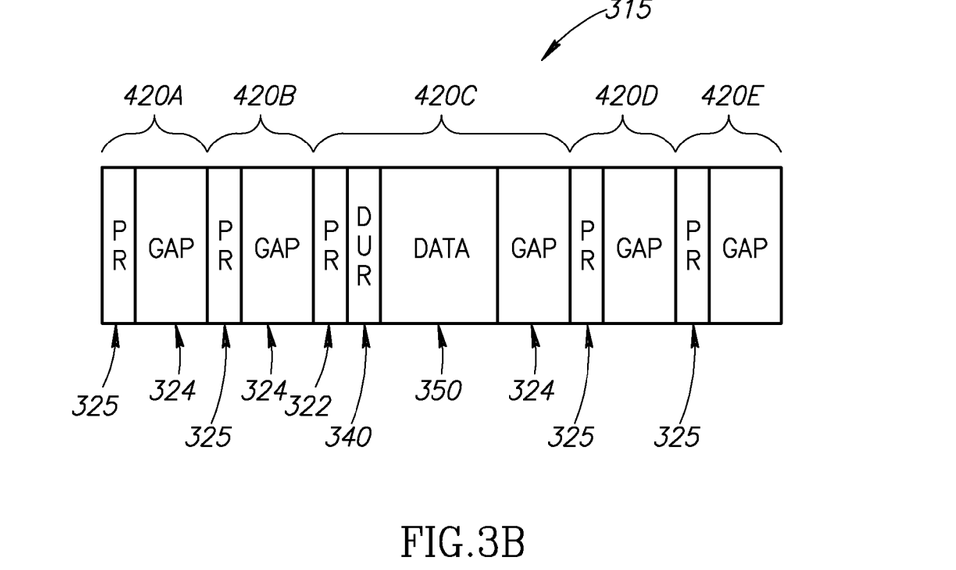
FIG. 3B is an illustration of a timing diagram for an exemplary transmission cycle operating in accordance with the schedule of FIG. 3A.

In accordance with an alternative preferred embodiment of the present invention, the duration of transmission cycles 220 may be reduced by removing nulls 230. Reference is now made to FIGS. 3A and 3B. FIG. 3A illustrates a novel transmission start slot TDMA (time division multiple access) contention TXOP schedule 310, designed and operative in accordance with a preferred embodiment of the present invention. FIG. 3B illustrates timing diagram 315 for an exemplary transmission cycle operating in accordance with transmission start slot schedule 310.

As shown in FIG. 3A, schedule 310 may comprise a multiplicity of transmission start slots 320, analogous to transmission start slots 120 in the embodiment of FIG. 2A. However, each transmission start slot 320 may have a scheduled minimum duration of t. As will be described hereinbelow, t may be shorter in duration than duration d' in FIG. 2A.

Transmission frames 420 in FIG. 3B may generally correspond to transmission start slots 320 in FIG. 3A. As in the previous embodiment, each transmission frame 420 may comprise a preamble 222. Durations 340 and data payloads 350 may also be used as in the previous embodiment. For example, transmission frame 420C, including a preamble 322, a duration 340 and gap 324, may represent a transmission from a node with data to transmit.

However, transmission frames 420 from nodes with no data payloads to transmit may be different than in the previous embodiment. Instead of transmitting a null 230 (FIG. 2B) to indicate a "null" transmission, such nodes may instead transmit a preamble 325. Preamble 325 may be an analog signal sufficiently different from preamble 322 to be recognized by receiving nodes as a different type of preamble. When a preamble 325 may be received, receiving nodes may interpret it to signal a null transmission without explicitly requiring a null 230 to be actually transmitted as well.

It will be appreciated that by eliminating the transmission of nulls 230, the duration of transmission frames 420 may be generally shorter than transmission frames 220. It will further be appreciated that transmission start slots 320 may be of shorter duration than transmission start slots 120. Duration t may be expected to be shorter than duration d'. An exemplary value of t may be equal to d, as in the prior art. Therefore, in accordance with a preferred embodiment of the present invention, schedule 310 may be of generally the same duration as schedule 10. Transmission start slots 320 may be sub-burst slots with a shorter duration than a minimal transmission burst duration It will be appreciated that by eliminating the transmission of nulls 230, it may not be possible for non synchronized nodes to resynchronize using "current position" included in such transmissions. In accordance with an alternative preferred embodiment of the present invention, if a node loses synchronization, it may use PCS to detect a transmission frame from its own group. Once synchronization with its own group may be established, it may wait for its assigned time slot 120 and transmit a null transmission with a presumed expanded current position (as in the embodiment of FIG. 2E) and the other nodes on the network may synchronize according to the transmitted current position. It will be appreciated that the nodes on the network may synchronize with the most recently transmitted expanded current position, regardless of whether or not it may be the "true" current position as originally defined in schedule 110. Facilitating synchronization may be of higher priority than determining whether or not the current position accurately reflects a timing diagram as per original schedule 110.

It will also be appreciated that, in the context of the embodiment of FIG. 3 where explicit null transmissions may not be regularly transmitted, expanded current position information may be occasionally transmitted by synchronized nodes as well. In accordance with a preferred embodiment of the present invention, nominally synchronized nodes that may not require resynchronization may from time to time transmit null transmissions with expanded current position information. Receiving nodes may resynchronize in accordance with the expanded current position without regard to a "true" current position. It will be appreciated that in such manner, the likelihood for synchronization across the network may increase.

As discussed hereinabove, ACK and RTS frames may be used in addition to, or instead of null transmissions 220 as an instrument for synchronizing nodes to a current schedule 110. Accordingly, it will be appreciated that expanded current position information may be added to non null, transmission frames 220 without data payloads, such as, for example, ACK and RTS frames.

In any case, it will be appreciated that if no other option may be feasible, a node may resynchronize when a new MAP is transmitted after the end of a transmission cycle 115.

It will be appreciated that the specification of a powerline medium is exemplary. The present invention may be implemented on any data network. It will further be appreciated that the specification of HPNA v3.1 may also be exemplary. The present invention may be implemented in accordance with other standards such as 802.11, HPAV, and G,hn. It will be appreciated, however, that support for the present invention must be included the current specifications for a standard in order for such implementation to be successful.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method implemented on a network node comprising:
receiving an adjustable schedule of transmission start slots, wherein said transmission start slots represent transmission initiation opportunities for the initiation of data transmission by at least one of a plurality of network devices on a network; and
transmitting a current transmission position of said node within all groups of said schedule suitable for full resynchronization to said adjustable schedule by at least one other said network node.

2. The method according to claim 1 and wherein:
said transmission start slots in said adjustable schedule are scheduled in transmission groups, each said transmission group associated with a group of said network devices; and
said current transmission position contains at least an indication of a current said transmission group and a current said transmission start slot within said current transmission group.

3. The method according to claim 2 and wherein said current transmission position also contains indications of each other said transmission groups and current transmission start slots with said transmission groups.

4. The method according to claim 3 and wherein said transmitting is in response to said network node losing synchronization with said adjustable schedule.

5. The method according to claim 3 and wherein said transmitting is scheduled without relation to a loss of synchronization with said adjustable schedule by said network node.

6. The method according to claim 1 and wherein said transmitting also comprises transmitting said current transmission position together with a data payload.

7. The method according to claim 1 and wherein said transmitting also comprises transmitting said current transmission position together with a null transmission.

8. The method according to claim 1 and wherein said transmitting also comprises transmitting said current transmission position within at least one of an acknowledgement (ACK) or request to send (RTS).

9. A method implemented on a network node comprising:
receiving an adjustable schedule of transmission start slots, wherein said transmission start slots represent transmission initiation opportunities for the initiation of data transmission by at least one of a plurality of network devices in a network;
listening for transmissions by other said network nodes according to said received schedule, said transmissions at least indicating a current position within all transmission groups of said adjustable schedule; and
adjusting said received schedule in accordance with said indicating.

10. The method according to claim 9 and wherein:
said transmission start slots in said adjustable schedule are scheduled in said transmission groups, each said transmission group associated with a group of said network devices; and
said current position contains at least an indication of a current said transmission group and a current said transmission start slot within said current transmission group.

11. The method according to claim 10 and wherein said adjusting also comprises:
synchronizing said current transmission group in said adjustable schedule in accordance with said current transmission group in said current position; and
synchronizing said current transmission slot in said adjustable schedule in accordance with said current transmission slot in said current position.

12. The method according to claim 10 and wherein said current position also contains indications of each other said transmission groups and current transmission start slots within said transmission groups.

13. The method according to claim 12 and wherein said adjusting also comprises:
synchronizing each said transmission group in said adjustable schedule in accordance with each said transmission group in said current position; and
synchronizing each said current transmission slot in said each transmission group in said adjustable schedule in accordance with said current position.

14. The method according to claim 9 and wherein said transmissions comprise said current position and a data payload.

15. The method according to claim 9 and wherein said transmissions comprise said current position and a null transmission.

16. The method according to claim 9 and wherein said transmitting also comprises transmitting said current position and at least one of an ACK or RTS.

17. A network node comprising:
a receiver to receive an adjustable schedule of transmission start slots, wherein said transmission start slots represent transmission initiation opportunities for the initiation of data transmission by at least one of a plurality of network devices on a network; and
a transmitter to transmit a current transmission position representing all current transmission groups for resynchronization to said adjustable schedule by at least one other said network node.

18. The network node according to claim 17 and wherein:
said transmission start slots in said adjustable schedule are scheduled in said transmission groups, each said transmission group associated with a group of said network devices; and
said current transmission position contains at least an indication of a current said transmission group and a current said transmission start slot within said current transmission group.

19. The network node according to claim 18 and wherein said current transmission position also contains indications of each other said transmission groups and current transmission start slots with said transmission groups.

20. The network node according to claim 17 and wherein said transmitter also comprises means to transmit said current transmission position with a data payload.

21. The network node according to claim 17 and wherein said transmitter also comprises means to transmit said current transmission position with a null transmission.

22. The network node according to claim 17 and wherein said transmitter also comprises means for transmitting said current transmission position and at least one of an ACK or RTS.

23. A network node comprising:
a receiver to receive an adjustable schedule of transmission start slots, wherein said transmission start slots represent transmission initiation opportunities for the initiation of data transmission by at least one of a plurality of network devices in a network;
a listening to listen for transmissions by other said network nodes according to said received schedule, said transmissions at least indicating a current position for all transmission groups within said adjustable schedule; and
an adjuster to adjust said received schedule in accordance with said current position.

24. The network node according to claim 23 and wherein:
said transmission start slots in said adjustable schedule are scheduled in said transmission groups, each said transmission group associated with a group of said network devices; and
said current position contains at least an indication of a current said transmission group and a current said transmission start slot within said current transmission group.

25. The network node according to claim 24 and wherein said adjuster also comprises:
current transmission group synchronizing for synchronizing said current transmission group in said adjustable schedule in accordance with said current transmission group in said current position; and
current transmission slot synchronizing means for synchronizing said current transmission slot in said adjustable schedule in accordance with said current transmission slot in said current position.

26. The network node according to claim 24 and wherein said current position also contains indications of each other said transmission groups and current transmission start slots within said transmission groups.

27. The network node according to claim 26 and wherein said adjusting also comprises:

current transmission group synchronizing means for synchronizing each said transmission group in said adjustable schedule in accordance with each said transmission group in said current position; and current transmission slot synchronizing means for synchronizing each said current transmission slot in said each transmission group in said adjustable schedule in accordance with said current position.

28. The network node according to claim 23 and wherein said transmissions comprise said current position and a data payload.

29. The network node according to claim 23 and wherein said transmissions comprise said current position and a null transmission.

30. The network node according to claim 23 and wherein said transmitter also comprises transmitting means for transmitting said current position and at least one of an ACK or RTS.

* * * * *